Sept. 14, 1965 A. J. LEITICH ET AL 3,206,547
AUTOMATIC CONTROL SYSTEM
Filed Nov. 19, 1962
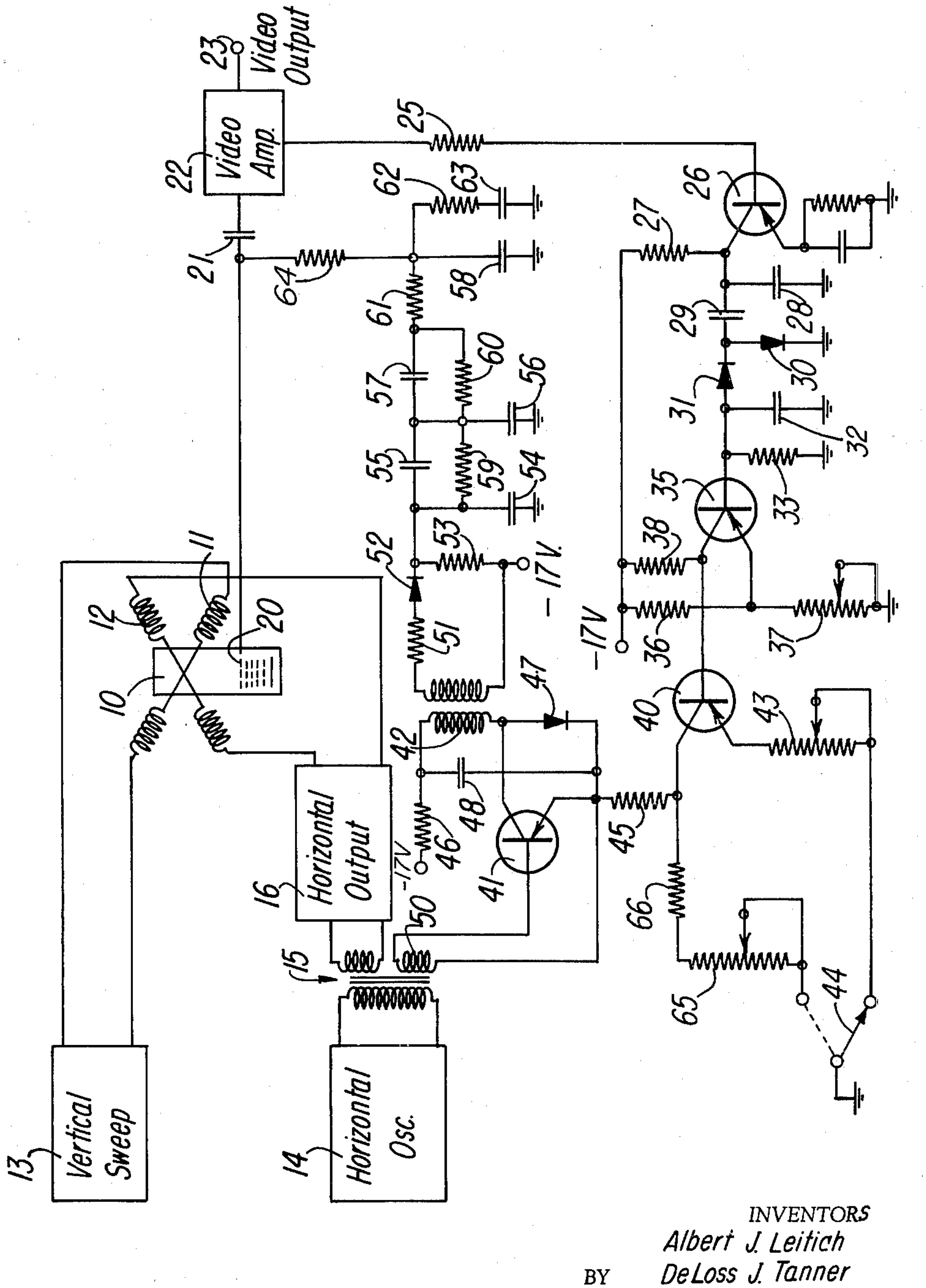
INVENTORS
Albert J. Leitich
BY DeLoss J. Tanner
Mueller & Aichele Attys.

3,206,547
Patented Sept. 14, 1965

3,206,547
AUTOMATIC CONTROL SYSTEM

Albert J. Leitich, Chicago, and De Loss J. Tanner, Bensenville, Ill., assignors to Motorola, Inc., Chicago, Ill., a corporation of Illinois Filed Nov. 19, 1962, Ser. No. 238,658
10 Claims. (Cl. 178—7.1)

This invention relates to television camera equipment, and more particularly, to a circuit for providing the target voltage for a television pickup tube wherein the target voltage is automatically controlled in accordance with the camera video output signal to compensate for changes in the light on the subject being televised.

In television camera systems which produce signals representing the light and dark points on an object being scanned, it is desirable, in many cases, to provide automatic compensation for change in the illumination of the subject. For example, if the camera is used to pick up a scene out of doors, compensation for difference in the illumination such as that caused by clouds shading the sun is necessary. This can be accomplished manually or automatically so that the camera output signal is suitable to produce a satisfactory picture at all times. Automatic compensation is particularly desired in cases where the camera is unattended as in closed circuit systems for observing a scene at one point and reproducing it at one or more other remote points.

Compensation for changes in the light applied to a subject can be provided by appropriate change in the target voltage applied to the pickup tube of the camera. When the light decreases, the target voltage can be increased to thereby increase the sensitivity of the pickup tube, so that the output signal provided by the camera will produce an acceptable picture at all times. Automatic light compensation circuits responsive to the output signal of the camera have been used, but these have been unduly complex and expensive for many applications. For closed circuit use, as mentionad above, it is desired to provide a very simple and compact camera and one which can be inexpensively constructed.

It is therefore an object of the present invention to provide an improved light compensating circuit for a television camera unit.

A further object of the invention is to provide a light compensating circuit for a television camera unit which provides a video output of a substantially constant value when the light applied to the object being televised varies through a wide range.

Another object of the invention is to provide a light compensating system for a television camera which is responsive to the amplitude of the video signal produced by the camera, and operates to control the potential applied to the target of the television pickup tube.

A still further object of the invention is to provide automatic target voltage control for a cathode ray television pickup tube wherein the target voltage is produced from the sweep for the tube and controlled by the amplitude of the video signal developed by the pickup tube .

A feature of the invention is the provision of an automatic target voltage control system for a camera tube including a transistor switch circuit activated by the horizontal sweep for the tube and to which current is applied in accordance with the output from the tube, with the output of the switch circuit being stepped-up and rectified to provide the target voltage. The system provides a low source impedance so that effective control is provided over wide range of light values.

Another feature of the invention is the provision of an automatic target voltage control system for a cathode ray camera tube, including a rectifier circuit for providing a control voltage which varies with the amplitude of the video signal developed by the camera tube and which is used to control the current through a transistor switch circuit which interrupts the current at the sweep rate, with a transformer stepping up the voltage pulses developed when the current is interrupted and a rectifier and filter circuit applying the stepped-up voltage to the target electrode of the camera tube.

Still another feature of the invention is the provision of an automatic target control system as defined in the preceding paragraph including a transistor regulator circuit in series with the transistor switch circuit to control the current applied thereto, and wherein the regulator transistor operates from a low voltage source and is subject to a relatively small voltage as compared to the target voltage produced by the system.

A further feature is the provision of a target voltage control system including an automatic control circuit as described in the preceding paragraphs and a manually adjusted control circuit, with switch means for selectively connecting the automatic circuit and the manual circuit. The manual target control is a direct current circuit which is isolated from the target voltage so that it can be remotely controlled through long leads without producing interference, and special cables are not required.

The invention is illustrated in the accompanying drawing, wherein the single figure is a schematic diagram of the target voltage system of the invention.

In the television camera system of the invention, a pickup tube is provided which may be of the Vidicon type. Horizontal and vertical sweep systems provide the deflection current for a yoke provided on the tube to sweep the beam of the tube. The signal picked up by the tube is applied to a video amplifier which furnishes the video output of the camera system. An amplifier and rectifier circuit is connected to the video amplifier of the camera and provides a control voltage which varies with the amplitude of the video signal. This is used to control the conductivity of a regulator transistor provided in series with a transistor switching circuit. The switching circuit is actuated at the horizontal sweep frequency so that an intermittent current is applied to the primary winding of a step-up transformer. The stepped-up output voltage from the secondary winding of the transformer is rectified and filtered and applied to the target electrode of the pickup tube. The target voltage varies with the current applied through the regulator transistor to the switching circuit, and this in turn varies with the control voltage produced from the amplitude of the video signal. Thus, the target voltage is compensated for changes in amplitude of the video output resulting from the change in the level of the light applied to the object which is being scanned. A switch may be provided to selectively connect a manual control in place of the automatic control, and the manual adjustment of the target voltage is completely independent of the automatic control. The controls are accomplished by direct current circuits and remote operation can be easily provided.

Referring now to the drawing, the cathode ray pickup tube 10 has a yoke thereon including vertical deflection coils 11 and horizontal deflection coils 12. The vertical deflection coils are supplied by vertical sweep circuit 13. The horizontal oscillator 14 develops the horizontal sweep frequency and applies the same through transformer 15 to the horizontal output circuit 16. The output circuit 16 provides horizontal sweep current to the horizontal deflection coils 12.

The video signal developed in the pickup tube 10 is derived from the target electrode 20 thereof and applied through coupling capacitor 21 to video amplifier 22.

The output of the video amplifier 22 is developed at terminal 23, and may be connected through either a wire line or a radio link to receiver equipment. A sample of the video signal is derived from the video amplifier 22 through isolating resistor 25. The video signal thus derived is amplified in a band limited amplifier including transistor 26. The signal applied to the base electrode of transistor 26 has positive portions representing white in the object being scanned. The output of the amplifier 26 appears across the load resistor 27, with white producing negative portions. This signal is applied to the cascade voltage doubler rectifier circuit including capacitors 28 and 29, rectifiers 30 and 31, capacitor 32 and load resistor 33. As the voltage doubler responds to both positive and negative excursions of the video signal, the rectified voltage represents the total change in voltage, and the voltage doubler rectifier could alternatively be connected to a point where white produces positive portions. Capacitor 28 bypasses high frequencies so that the system is not responsive to small area objects in the picture.

The rectified voltage is applied to forward bias transistor 35 which functions as a direct current amplifier. The emitter electrode of transistor 35 is connected to the voltage divider formed by resistors 36 and 37. Resistor 37 is variable to control the emitter voltage of transistor 35 to set the level at which the automatic target circuit will hold. The ouput of the amplifier 35, developed across resistor 38, increases in a positive direction with the intensity of the light on the object being televised. This voltage is applied to the base of transistor 40 to bias the same to control the emitter to collector current therein. The current in the emitter to collector circuit of transistor 40 varies inversely with the control voltage applied to the base thereof.

The emitter to collector path of transistor 40 is connected in series with the emitter to collector path of transistor 41 and the primary winding of transformer 42 across the power supply. Control of the current in this series circuit by transistor 40, therefore controls the current applied to the primary winding of transformer 42. This circuit is completed by resistor 43 connected from the emitter electrode of transistor 40 to ground, resistor 45 connected from the collector electrode of transistor 40 to the emitter electrode of transistor 41, and resistor 46 connected from the primary winding of transformer 42 to the voltage supply terminal. Resistor 43 is adjustable to control the maximum target voltage which can be applied under automatic operation.

The coupling transformer 15 between the horizontal oscillator 14 and the horizontal output stage 16 includes a tertiary winding 50 connected between the base and emitter electrodes of transistor 41. Pulses at the horizontal sweep rate are applied to transistor 41 and operate to periodically interrupt the current through the primary winding of transformer 42. When the current in transformer 42 is cut off by the transistor 41, the magnetic field of the transformer collapses and a voltage pulse is generated in the secondary winding of this transformer. This voltage is stepped-up by the increased number of turns in the secondary winding of transformer 42. Capacitor 48 provides a return path for current in primary winding 42. Rectifier 47 operates as a damper and supplements the conduction of transistor 41 during part of the time it conducts. The rectifier 47 is not required for operation of the system and can be eliminated, but it is effective to increase the efficiency and to reduce interference.

The voltage in the secondary winding of transformer 42 is applied through series resistor 51 and rectified in diode 52. The rectified voltage appears across resistor 53, being developed with respect to the negative supply potential. This is applied through a filter network including capacitor 54, 55, 56, 57 and 58 and resistors 59, 60, 61 and 62, the latter being in series with capacitor 63. The rectified voltage appearing across capacitor 58 is applied through coupling resistor 64 to the target electrode 20 of the camera tube 10. The voltage applied to target electrode 20 varies inversely with the video signal derived from the video amplifier 22 and applied to the amplifier including transistor 26.

The switch 44 can be moved to the dotted position to connect resistors 65 and 66 in series with the switch transistor 41 and the primary winding of transformer 42. In such case the current applied to the transformer primary winding is controlled by the setting of the variable resistor 65. This current cut off by transistor 41, as previously stated, controls the voltage pulses developed in the transformer 42, and these voltage pulses are rectified to provide the target voltage. The manual control is entirely independent of the automatic control and can be set at any value desired. That is, the manually variable resistor 65 in series with resistor 66, is substituted for the resistance of transistor 40 which is automatically controlled by the video signal. The system can be changed from automatic to manual control simply by operation of switch 44. The manual control, as well as the switch for changing from automatic to manual control operates in a direct current circuit and these can be provided remotely. The remote controls can be connected by long leads without shielding and without producing interference in the target voltage.

It is, therefore, seen that when automatic target control is desired, the voltage applied to the target electrode is controlled in accordance with the amplitude of the video signal. This action is effective to compensate for changes in light to provide a video output signal which is within the range required for proper operation of receivers which display the scene which is picked up by the tube 10. Because of the control, from the video signal, it is not necessary to use large resistance in the target voltage system to compensate the voltage for changes in the video signal, and therefore the source impedance is low. This reduces the problem of leakage from the high voltage lead in the presence of high humidity. The low source impedance also renders the automatic control effective over a very wide range, and adequate control is provided when the light changes by a ratio as great at 5,000 to 1.

As previously stated, automatic operation is particularly useful when the camera is unattended as in closed circuit television systems. However, the circuit of the invention may be useful in other systems, and is not limited to use in closed circuit systems. The circuit provides the desired operating controls, including an adjustment to set the desired video level, and an adjustment to provide the maximum target voltage setting. As previously stated, a separate adjustment is provided to set the operating point for manual operation. The manual control can be provided remotely by use of unshielded leads.

The automatic target voltage control system of the invention is provided as a relatively simple and inexpensive circuit. The regulator transistor operates at low voltage since it is in series in the switching circuit, and may be an inexpensive transistor. The system provides high performance and is not critical of adjustment. The circuit has been found to be highy satisfactory in compensating for wide changes in the light on the subject being televised.

We claim:

1. In a television camera system including a cathode ray tube, a sweep circuit for deflecting the beam of the tube, and a video amplifier for amplifying the signal developed by the tube, a circuit for providing the target voltage for the tube including in combination, a transistor switch circuit coupled to the sweep circuit and operating at the sweep frequency, current supply means coupled to the video amplifier for providing current to said transistor switch circuit, said current supply means including automatic means responsive to the video signal for providing current which varies inversely with the amplitude of the video signal, manual control means for providing current which varies with the setting of a manual control, and switch means having a first position for rendering said automatic means operative and a second position for rendering said manual means operative, a step-up transformer having primary and secondary windings, said transistor switch circuit having an output portion connected to said primary winding of said step-up transformer, and rectifier and filter means connected to said secondary winding of said transformer for providing the target voltage for the cathode ray tube, whereby the target voltage is provided in response to operation of the sweep circuit, and such voltage varies inversely with the amplitude of the video signal when said switch means is in said first position, and in accordance with the setting of said manual control when said switch means is in said second position.

2. In a television camera system including a cathode ray tube, a sweep circuit for deflecting the beam of the tube, and a video amplifier for amplifying the signal developed by the tube, a circuit for providing the target voltage for the tube including in combination, control means coupled to the video amplifier for providing a control voltage which varies with the amplitude of the video signal, said control means including capacitor means bypassing high frequency components of the video signal and rectifier means for producing a direct current control voltage, a transistor switch circuit including a transistor having a control electrode coupled to the sweep circuit for operating said transistor switch circuit at the sweep frequency, current supply means responsive to said direct current control voltage for providing current to said transistor switch circuit which varies inversely with the amplitude of the video signal, a step-up transformer having primary and secondary windings, said transistor switch circuit having an output portion connected to said primary winding of said step-up transformer, and rectifier and filter means connected to said secondary winding of said transformer for providing the target voltage for the cathode ray tube, whereby the target voltage is provided in response to operation of the sweep circuit, and such voltage varies inversely with the video signal as represented by said control voltage.

3. In a television camera system including a cathode ray tube, a sweep circuit for deflecting the beam of the tube, and a video amplifier for amplifying the signal developed by the tube, a circuit for providing the target voltage for the tube including in combination, rectifier means coupled to the video amplifier for providing a control voltage which varies with the amplitude of the video signal, a step-up transformer having primary and secondary windings, potential supply means, first and second transistors each having a control electrode and output electrodes, circuit means connecting said output electrodes of said first and second transistors in series with said primary winding to said potential supply means, means applying said control voltage to said control electrode of said first transistor for varying the conductivity between said output electrodes thereof and causing the current through said primary winding to vary inversely with the amplitude of the video signal, means connecting said control electrode of said second transistor to the sweep circuit for repeatedly cutting off said second transistor at the sweep frequency, the interruption of current in said primary winding when said second transistor is cut off causing the field in said transformer to collapse whereby high voltage pulses are produced in said secondary winding and rectifier and filter means connected to said secondary winding of said transformer for providing the target voltage for the cathode ray tube, whereby the target voltage is provided in response to operation of the sweep circuit, and such voltage varies inversely with the video signal as represented by said control voltage.

4. In a television camera system including a cathode ray tube, a sweep circuit for deflecting the beam of the tube, and a video amplifier for amplifying the signal developed by the tube, a system for providing the target voltage for the tube including in combination, rectifier means coupled to the video amplifier for providing a control voltage which varies with the amplitude of the video signal, a step-up transformer having primary and secondary windings first and second transistors each having a control electrode and output electrodes, a circuit connecting said output electrodes of said first and second transistors in series with said primary winding to supply current thereto, means applying said control voltage to said control electrode of said first transistor for controlling the conductivity between said output electrodes thereof and causing the current through said primary winding to vary inversely with the amplitude of the video signal, means connecting said control electrode of said second transistor to the sweep circuit for applying pulses to said control electrode at the sweep frequency to repeatedly cut off said second transistor and interrupt current flow between said output electrodes thereof and through said primary winding, interruption of current through said primary winding causing the field of said transformer to collapse so that high voltage pulses are produced in said secondary winding thereof, and rectifier and filter means connected to said secondary winding of said transformer for providing the target voltage for the cathode ray tube.

5. In a television camera system including a cathode ray tube, a sweep circuit for deflecting the beam of the tube, and a video amplifier for amplifying the signal developed by the tube, a circuit for providing the target voltage for the tube including in combination, amplifier means coupled to the video amplifier for amplifying signals within a limited bandwidth, voltage doubler rectifier means connected to said amplifier means for providing a control voltage which varies with the amplitude of the video signal, direct current amplifier means for amplifying said control voltage, a step-up transformer having primary and secondary windings, potential supply means, first and second transistors each having a control electrode and output electrodes, circuit means connecting said output electrodes of said first and second transistors in series with said primary winding to said potential supply means, means coupling said direct current amplifier to said control electrode of said first transistor for applying the amplified control voltage thereto and varying the conductivity between said output electrodes thereof so that the current through said primary winding varies inversely with the amplitude of the video signal, means connecting said control electrode of said second transistor to the sweep circuit for cutting off said second transistor at the sweep frequency so that current flow between said output electrodes of said second transistor is repeatedly interrupted, with the interruption of current in said primary winding by action of said second transistor causing the field in said transformer to collapse so that high voltage pulses are produced in said secondary winding, and rectifier and filter means connected to said secondary winding of said transformer for providing the target voltage for the cathode ray tube, whereby the target voltage is provided in response to operation of the sweep circuit, and such voltage varies inversely with the video signal as represented by said control voltage.

6. In a television camera system including a cathode ray tube, a sweep circuit for deflecting the beam of the tube, and a video amplifier for amplifying the signal developed by the tube, a system for providing the target voltage for the tube including in combination, rectifier means coupled to the video amplifier for providing a control voltage which varies with the amplitude of the video signal, a step-up transformer having primary and secondary windings, first and second transistors each having a control electrode and output electrodes, a circuit connecting said output electrodes of said first and second transistors in series with said primary winding to supply current thereto, means coupling said control electrode of said first transistor to said rectifier means for controlling the conductivity between said output electrodes thereof and causing the current through said circuit to vary inversely with said control voltage, means connecting said control electrode of said second transistor to the sweep circuit for applying pulses to said control electrode at the sweep frequency to repeatedly cut off said second transistor, whereby current flow between said output electrodes of said second transistor and through said primary winding is interrupted causing the field of said transformer to collapse so that high voltage pulses are produced in said secondary winding thereof, and rectifier and filter means connected to said secondary winding of said transformer for providing the target voltage for the cathode ray tube from said high voltage pulses.

7. In a television camera system including a cathode ray tube, a sweep circuit for deflecting the beam of the tube, and a video amplifier for amplifying the signal developed by the tube, a circuit for providing the target voltage for the tube including in combination, rectifier means coupled to the video amplifier for providing a control voltage which varies with the amplitude of the video signal, a step-up transformer having primary and secondary windings, direct current potential supply means, first and second transistors each having a control electrode and output electrodes, variable resistance means, circuit means including switch means connecting said output electrodes of said first and second transistors in series with said primary winding to said potential supply means, means applying said control voltage to said control electrode of said first transistor for varying the conductivity between said output electrodes thereof and causing the current through said primary winding to vary inversely with the amplitude of the video signal, means connected to said control electrode of said second transistor for repeatedly cutting off said second transistor to interrupt the current in said primary winding whereby high voltage pulses are produced in said secondary winding, and rectifier and filter means connected to said secondary winding of said transformer for providing the target voltage for the cathode ray tube, said circuit means connecting said variable resistance means in series with said output electrodes of said second transistor and said switch means to said potential supply means, said switch means being operative to disconnect said first transistor and to connect said variable resistance means in series with said output electrodes of said second transistor for controlling the current therethrough in accordance with the setting of said resistance means.

8. In a television camera system including a cathode ray tube, a sweep circuit for deflecting the beam of the tube, and a video amplifier for amplifying the signal developed by the tube, a circuit for providing the target voltage for the tube including in combination, rectifier means coupled to the video amplifier for providing a control voltage which varies with the amplitude of the video signal, a step-up transformer having primary and secondary windings, direct current potential supply means, first and second transistors each having a control electrode and output electrodes, manually variable resistance means, switch means having first and second contact means, circuit means connecting said first contact means, said output electrodes of said first and second transistors and said primary winding in series across said potential supply means, said circuit means further connecting said second contact means, said variable resistance means, said output electrodes of said second transistor and said primary winding in series across said potential supply means, means applying said control voltage to said control electrodes of said first transistor for varying the conductivity between said output electrodes thereof, means connected to said control electrode of said second transistor for repeatedly cutting off said second transistor to interrupt the current in said primary winding, and rectifier and filter means connected to said secondary winding of said transformer for providing the target voltage for the cathode ray tube, said switch means being operative to actuate said first contact means so that said first transistor controls the current in said primary winding to cause the target voltage to vary inversely with the amplitude of the video signal, said switch means being operative to actuate said second contact means so that said variable resistance means controls the current in said primary winding and thereby controls the target voltage in accordance with the manual setting of said resistance means.

9. In a television camera system including a cathode ray tube, a sweep circuit for deflecting the beam of the tube, and a video amplifier for amplifying the signal developed by the tube, a circuit for providing the target voltage for the tube including in combination, rectifier means coupled to the video amplifier for providing a control voltage which varies with the amplitude of the video signal, a step-up transformer having primary and secondary windings, direct current potential supply means, first and second transistors each having a control electrode and output electrodes, manually variable resistance means, switch means having first and second fixed contacts and a movable contact connected to a reference potential, circuit means connecting said first fixed contact, said output electrodes of said first and second transistors and said primary winding in series to said potential supply means, said circuit means further connecting said second contact means, said variable resistance means, said output electrode of said second transistor and said primary winding in series to said potential supply means, means applying said control voltage to said control electrode of said first transistor for varying the conductivity between said output electrodes thereof, means connected to said control electrode of said second transistor for repeatedly cutting off said second transistor to interrupt the current in said primary winding, and rectifier and filter means connected to said secondary winding of said transformer for providing the target voltage for the cathode ray tube, said switch means being operative to connect said movable contact to said first fixed contact so that said first transistor controls the current in said primary winding to cause the target voltage to vary inversely with the amplitude of the video signal, said switch means being operative to connect said movable contact to said second fixed contact so that said variable resistance means controls the current in said primary winding and thereby controls the target voltage in accordance with the manual setting of said resistance means.

10. In a television camera system including a cathode ray tube, a sweep circuit for deflecting the beam of the tube, and a video amplifier for amplifying the signal developed by the tube, a circuit for providing the target voltage for the tube including in combination, rectifier means coupled to the video amplifier for providing a control voltage which varies with the amplitude of the video signal, a step-up transformer having primary and secondary windings, direct current potential supply means, first and second transistors each having a control electrode and output electrodes, first and second manually variable resistance means, switch means having first and second fixed contacts and a movable contact connected to a reference potential, circuit means connecting said first fixed contact, said first variable resistance means, said output electrodes of said first and second transistors and said primary winding in series to said potential supply means, said circuit means further connecting said second contact means, said second variable resistance means, said output electrode of said second transistor and said primary winding in series to said potential supply means, means applying said control voltage to said control electrode of said first transistor for varying the conductivity between said output electrodes thereof, means connected to said control electrode of said second transistor for repeatedly cutting off said second transistor to interrupt the current in said primary winding, and rectifier and filter means connected to said secondary winding of said transformer for providing the target voltage for the cathode ray tube, said switch means being operative to connect said movable contact to said first fixed contact so that said first transistor controls the current in said primary winding to cause the target voltage to vary inversely with the amplitude of the video signal, wth asid first variable resistance means controlling the maximum target voltage, said switch means being operative to connect said movable contact to said second fixed contact so that said second variable resistance means controls the current in said primary winding and thereby controls the target voltage in accordance with the manual setting of said second resistance means.

References Cited by the Examiner

UNITED STATES PATENTS

| | | | |
|---|---|---|---|
| 2,833,957 | 5/58 | Horowitz | 315—10 |
| 2,942,148 | 6/60 | Fathauer et al. | 315—10 |
| 3,086,077 | 4/63 | Mayer | 178—7.2 |
| 3,102,924 | 9/63 | Legler | 178—7.2 |

DAVID G. REDINBAUGH, *Primary Examiner.*